United States Patent [19]
Bulteau

[11] 3,860,721

[45] Jan. 14, 1975

[54] METHODS OF TREATING BILIARY LITHIASIS

[75] Inventor: Gérard C. Bulteau, Paris, France

[73] Assignee: Societe D'Etudes Scientifiques et Industrielles de L'Ile-De-France, Paris, France

[22] Filed: May 14, 1973

[21] Appl. No.: 359,678

Related U.S. Application Data

[60] Division of Ser. No. 270,626, July 11, 1972, Pat. No. 3,790,681, Continuation-in-part of Ser. No. 124,957, March 16, 1971, abandoned, Continuation-in-part of Ser. No. 760,973, Sept. 19, 1968, Pat. No. 3,632,629.

[30] Foreign Application Priority Data
Nov. 22, 1967 France .......................... 67.133439

[52] U.S. Cl. ................................................ 424/308
[51] Int. Cl. ........................................... A61k 27/00

[58] Field of Search ............................ 424/308, 311

[56] References Cited
UNITED STATES PATENTS
3,549,691  12/1970  Leigh et al. ..................... 424/308 X

*Primary Examiner*—Frederick E. Waddell
*Attorney, Agent, or Firm*—Nolan & Baxley

[57] ABSTRACT

The methods of this invention are useful for the treatment of biliary lithiasis in mammals. The methods involve administering to mammals certain fluorinated derivatives of esters of phenoxy isobutyric acid. While mammals subjected to a lithogenous regime developed cohesive doubly refractive crystals, mammals on the same regime and treated by the methods of this invention developed no lithiasis.

6 Claims, No Drawings

METHODS OF TREATING BILIARY LITHIASIS

This application is a division of U.S. patent application Ser. No. 270,626, filed July 11, 1972, now U.S. Pat. No. 3,790,681. The application Ser. No. 270,626 is a continuation-in-part of U.S. patent application, Ser. No. 124,957, filed Mar. 16, 1971, now abandoned. The U.S. patent application Ser. No. 124,957 is a continuation-in-part of U.S. patent application Ser. No. 760,973 filed Sept. 19, 1968, now U.S. Pat. No. 3,632,629.

This invention relates to methods of treating biliary lithiasis in mammals. The methods comprise administering to mammals, orally or parenterally such as subcutaneously or intramuscularly, fluorinated derivatives of the esters of phenoxy isobutyric acid. The daily dosage is within the range of 10 to 360 mg/kg of body weight of the mammal treated, and preferably for man within the range of 140 to 280 mg/kg of body weight, depending upon the severity of the case.

The fluorinated derivatives of the esters of phenoxy isobutyric acid employed in the methods of this invention have the formula:

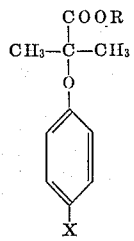

in which R is an alkyl radical of 1 to 5 carbon atoms either straight or branched chain; X is trifluoromethyl, trifluoromethylthio, trifluoromethylsulfinyl or trifluoromethylsulfonyl.

The process of preparation of the fluorinated derivatives of the esters of the phenoxy isobutyric acid employed in the methods of this invention consists in starting with a substituted phenol in combination with a radical such as trifluoromethyl, trifluoromethylthio, trifluoromethylsulfinyl, trifluoromethylsulfonyl; treating it with chloroform and acetone in the presence of potash so as to obtain the corresponding phenoxy isobutyric acid. This is then esterified by an alcohol of low molecular weight such as methanol, ethanol, propanol, isopropanol, etc. in the presence of a catalyzing agent. The ethyl esters are particularly effective because of their high cholesterol control properties.

Typical examples of the derivatives of esters of phenoxy isobutyric acid utilized in the methods of this invention are as follows:

EXAMPLE I

ETHYL-P-TRIFLUOROMETHYLPHENOXYISOBUTYRATE

Stage A P-Nitrotribromotoluene

Into a 1 liter three-necked flask equipped with a mechanical agitator, an ascendant refrigerant and a dropping funnel, there are introduced 137 g (1 mole) of p-nitrotoluene. The bromine is poured slowly into the flask heated to 195°–200°C. When the introduction of the bromine is completed, the mixture is allowed to return to room temperature and the product is extracted with petroleum ether. The product is then treated with a solution of sodium hypobromide for 48 hours. When the reaction is completed, the product is dried, washed with water and recovered with methanol. 112 G of p-nitrotribromotoluene are obtained. (Yield:30percent m.p. 86°C)

Stage B P-Trifluoromethylnitrobenzene

Into a 1 liter flask equipped with a small distillation column joined to a descendant refrigerant, 112 g (0.3 mole) of p-nitrotribromotoluene and 70 g of pulverized antimony trifluoride are introduced. The flask is heated. When the highly exothermic reaction is completed, the product is distilled and is then extracted with ethyl ether. 40 G of p-trifluoromethylnitrobenzene are obtained. (Yield: 70 percent m.p. 40°C)

Stage C P-Trifluoromethylaniline

Into a 1 liter three-necked flask equipped with a mechanical agitator, a thermometer and a dropping funnel are introduced 40 g of p-trifluoromethylnitrobenzene (0.2 mole) and 120 ml of absolute ethanol. There is then poured in under agitation a solution of 240 g of stannous chloride in 200 ml of hydrochloric acid (d: 1.19). When the reduction is completed, the mixture is neutralized with soda lye (36°B) and recovered several times with ether, then washed in water, dried with sodium anhydrous sulfate, and then distilled. 32 G of p-trifluoromethylaniline are obtained. (Yield: about 100 percent m.p.: 32°C)

Stage D P-trifluoromethylphenol

Into a 1 liter three-necked flask equipped with a mechanical agitator, a thermometer and a dropping funnel there are introduced 180 ml of water and then 27 ml of sulfuric acid (d: 1.84). With the temperature maintained at about 20°C, 32 g (0.2 mole) of p-trifluoromethylaniline are poured in slowly, and then drop by drop, a solution of 15 g of sodium nitrite in 70 ml of water. The mixture is maintained under agitation at room temperature for about 1 hour. The product formed is steam distilled and then recovered several times in ether. The ether is dried and distilled. 27.5 G of p-trifluoromethylphenol are obtained. (Yield: 85 percent)

Stage E P-Trifluoromethylphenoxyisobutyric acid

Into a 1 liter three-necked flask equipped with a mechanical agitator, an ascendant refrigerant and a dropping funnel there are introduced 27.5 g (0.17 mole) of p-trifluoromethylphenol, 105 g of acetone and 37 g of pellets of soda. The mixture is refluxed and 25 g of chloroform are poured slowly through the dropping funnel. When the reaction is completed, the acetone is removed under vacuum and the residue recovered in water and the pH is raised to 1 with concentrated hydrochloric acid. The product obtained is extracted in chloroform. 21 G of p-trifluoromethylphenoxyisobutyric acid are obtained. (Yield: 50 percent m.p.: 95°C)

Stage F Ethyl P-Trifluoromethylphenoxyisobutyrate

Into a 500 ml flask equipped with an asecndant refrigerant there are introduced 21 g (0.085 mole) of p-trifluoromethylphenoxyisobutyric acid and a mixture of 100 ml of absolute ethanol and 4 g of concentrated sulfuric acid of 66°B. The mixture is refluxed for 5 hours. It is extracted in chloroform, the solvent removed and the residue distilled. 13.8 G of ethyl p-trifluoromethylphenoxyisobutyrate are obtained. (Yield: 60 percent boiling at 2 to 3 mm.: 91°–94°C)

Other examples of compounds useful in the practice of the methods of treatment of this invention are the corresponding methyl or isobutyl p-trifluoromethylphenoxyisobutyric acid. Such corresponding compounds are produced by employing instead of 100 ml of ethanol, 70 ml of anhydrous methanol or 160 ml of isobutyl alcohol in Stage F.

Each of the active products of this invention may be incorporated in a tablet, capsule, ampule or other pharmaceutical form for administration to a mammal for the treatment of cholesterolemia or biliary lithiasis. For example, the active product, such as ethyl-P-trifluoromethylphenoxyisobutyrate, may be combined with pharmaceutical carriers such as lactose, starch and a small amount of magnesium stearate when incorporated in a tablet. Any one of the other active products described in Examples II, III and IV may likewise be combined with suitable pharmaceutical carriers in a tablet or other dosage form for administration to the mammal being treated.

EXAMPLE II

ETHYL-P-TRIFLUOROMETHYLTHIOPHENOXYISOBUTYRATE

Stage A P-Nitrophenylmethylsulphide

Into a 5 liter flask equipped with a mechanical agitator, an ascendant refrigerant and a dropping funnel there are introduced 315 g. (2 moles) of p-chloronitrobenzene and 1,500 ml. of 95 percent ethyl alcohol. The mixture is refluxed with agitation. As the reflux is continued, there is added in a thin stream a solution of 350 g. of sodium sulfide·9 $H_2O$, 50 g. of sulphur and 2,000 ml. of 95 percent alcohol.

Reflux is continued for one-half hour and then a solution of soda pellets in 150 ml. of water and 500 ml. of 95 percent alcohol is poured into the reaction mixture.

The reaction product is poured into a mixture of ice and water. The impurities are eliminated by filtration. The filtrate is acidified with hydrochloric acid (d: 1:15). The clear yellow precipitate obtained is dried and washed with water. It is then dissolved in 200 ml. of soda lye (36° B) and 2,000 ml. of water and poured into a 5 liter flask equipped with a mechanical agitator, an ascendant refrigerant and a dropping funnel. Then under agitation, 380 g. of dimethyl sulfate are added. The mixture is refluxed for 1 hour, being assured that the medium is alkaline. The mixture is then allowed to return to room temperature. The product crystallizes, is dried, washed with water and dried at 50° C. After recrystallization in methanol, 16 g. of p-nitrophenylmethylsulphide are obtained. (Yield: 50 percent, m.p. : 71°–72° C.)

Stage B P-Nitrophenyltrichloromethylsulphide

Into a 1 liter three-necked flask 169 g. (1 mole) of p-nitrophenylmethylsulphide are introduced and dissolved by heating in 620 ml. of chloroform. A part of the chloroform is then distilled and a stream of chlorine passed into the flask, the reaction temperature being maintained between 10° and 25° C. The reaction being photo sensitive, it is catalyzed by a luminous flux. The reaction is completed in 4 hours. The chloroform is distilled and the product recrystallized in acetone. 218 G. of p-nitrophenyltrichloromethylsulfide are obtained (Yield: 80 percent, m.p. 94° C.)

Stage C P-Nitrophenyltrifluoromethylsulphide

Into a 1 liter flask equipped with a small distillation column and a descendant refrigerant, are introduced 218 g. (0.8 mole) of p-nitrophenyltrichloromethylsulphide and 218 g. of pulverized antimony trifluoride. The mixture of the two compositions is brought rapidly to the boiling point. It is then distilled under vacuum. The product obtained is recovered in 900 ml. of sulfuric ether and 90 ml. of hydrochloric acid (d: 1.19) diluted one-half. The etherified layer is decanted and recovered several times by washing in one-half hydrochloric acid. The ether is dried in anhydrous sodium sulphate and then distilled. The product is then distilled. 112.4 G. of p-nitrophenyltrifluoromethylsulfide are obtained. (Yield: 60 percent, boiling at 9 mm.: 99°–103° C.)

Stage D P-Aminophenyltrifluoromethylsulfide

Into a 6 liter three-necked flask equipped with a mechanical agitator, a thermometer and a dropping funnel, are introduced 112.4 g. (0.5 mole) of p-nitrophenyltrifluoromethylsulfide and 400 ml. of 95 percent ethyl alcohol. Reduction is effected with a solution of 650 g. of stannous chloride in 490 ml. of hydrochloric acid (d: 1.19). After neutralization in soda, the product is extracted several times in ether, which is washed in water, dried in anhydrous sodium sulfate and then distilled. The product is then distilled. 80 G. of p-aminophenyltrifluoromethylsulphide are obtained. (Yield: 83 percent, boiling at 10 mm.: 98°–99° C.)

Stage E P-Hydroxyphenyltrifluoromethylsulphide

Into a 2 liter three-necked flask equpped with a mechanical agitator, a thermometer and a dropping funnel, there are introduced 450 ml. of water and then 100 ml. of pure sulfuric acid (d: 1.84). With the temperature being maintained at 20° C., 80 g. of p-aminophenyltrifluoromethylsulphide are poured in, in a thin stream, and then, drop by drop, a solution of 40 g. of sodium nitrite in 180 ml. of water. The mixture is maintained under agitation at room temperature for about 1 hour. The product formed is drawn off by steam and the product is recovered several times in ether. The ether is dried and distilled. 68.5 G. of p-hydroxyphenyltrifluoromethylsulphide are obtained. (Yield: 85 percent, m.p.: 52° C., boiling at 10 mm.: 90°–100° C.)

Stage F P-Trifluoromethylthiophenoxyisobutyric acid

Into a 1 liter three-necked flask, equipped with a mechanical agitator, a reflux refrigerant and a dropping funnel, there are introduced 260 g. of acetone, 68.5 g. of p-trifluoromethylthiophenol and 100 g. of soda pellets. The mixture is refluxed and 70 g. of chloroform are poured slowly into the dropping funnel. When the reaction is complete, the acetone is removed under vacuum and the residue recovered in water, then brought to a pH of 1 with concentrated hydrochloric acid. The product obtained is extracted with chloroform. 69 G. of p-trifluoromethylthiophenoxyisobutyric acid are obtained. (Yield: 70 percent, m.p.: 118° C.)

Stage G Ethyl P-Trifluoromethylthiophenoxyisobutyrate

Into a 500 ml. flask equipped with an ascendant refrigerant, are introduced 69 g. of p-trifluoromethylthiophenoxyisobutyric acid and a mixture of 280 ml. of absolute ethyl alcohol and 12 g. of sulfuric acid of 66° B. The mixture was refluxed for 6 hours. The mixture was extracted with chloroform, the solvent removed and the residue distilled. 49 G. of ethyl p-trifluoromethylthiophenoxyisobutyrate are obtained. (Yield: 65 percent, boiling at 5 mm.: 114°5 C.)

Other compounds useful in the practice of the methods of treatment of this invention are the corresponding isopropyl or n-pentyl p-trifluoromethylthiophenoxyisobutyrate. Such corresponding compounds are produced by employing instead of 100 ml of ethanol, 130 ml of anhydrous isopropyl or 190 ml of 1-pentyl alcohol.

EXAMPLE III

ETHYL P-TRIFLUOROMETHYLSULFINYLPHENOXYISOBUTYRATE

Stages A through F are the same as those described in Example II.

Stage G  P-Trifluoromethylsulfinylphenoxyisobutyric acid

Into a 2 liter three-necked flask, equipped with a mechanical agitator, a thermometer and a dropping funnel, are introduced 800 ml. of methanol, a solution of 40 g. of sodium metaperiodate in 370 ml. of water and finally 50 g. (0.178 mole) of p-trifluoromethylthiophenoxyisobutyric acid. The mixture is maintained under agitation at room temperature for 4½ hours. When the reaction is completed, the product, having been recovered several times in chloroform, is extracted. 44 G. of p-trifluoromethylsulfinylphenoxyisobutyric acid are obtained. (Yield: 83 percent, m.p. 123° C.)

Stage H Ethyl P-Trifluoromethylsulfinylphenoxyisobutyrate

The esterification of p-trifluoromethylsulfinylphenoxyisobutyric acid is effected as described in Example II, stage G. The corresponding ester is obtained. (Yield: 58 percent, boiling at 5 mm.: 122°–124° C.)

EXAMPLE IV.

ETHYL P-TRIFLUOROMETHYLSULFONYLPHENOXYISOBUTYRATE

Stages A through F are the same as those described in Example II.

Stage G  P-Trifluoromethylsulfonylphenoxyisobutyric acid

Into a 1 liter three-necked flask equipped with a mechanical agitator and an ascendant refrigerant, are introduced 58 g. of p-trifluoromethylthiophenoxyisobutyric acid dissolved in 300 ml. of acetic acid and 125 ml. of hydrogen peroxide in 110 volumes. When the reaction is completed, the acetic acid is dissolved under vacuum. The crystallized product at the bottom of the flask is recovered by water, dried, washed several times with water, then dried at 50° C. 55 G. of p-trifluoromethylsulfonylphenoxyisobutyric acid are obtained. (Yield: 85 percent, m.p.: 101° C.)

Stage H Ethyl P-Trifluoromethylsulfonylphenoxyisobutyrate

The esterification of p-trifluoromethylsulfonylphenoxyisobutyric acid is effected as illustrated in Example II, stage G. Ethyl p-trifluoromethylsulfonylphenoxyisobutyrate is obtained. (Yield: 61 percent, boiling at 5 mm.: 149°–152° C.) The compositions of this invention have been the subject of pharmacological and clinical studies to determine both their non-toxicity, their activity in controlling cholesterolemia and in preventing biliary lithiasis.

The toxicity tests of the medicaments of this invention carried out on mice weighing an average of 22 g. showed perfect tolerance of doses up to 120 mg. per mouse. (one-tenth ml.)

The pharmocological studies of the medicaments of the invention showed significant protection against lithiasis of the gall bladder as well as protection against chlesterolemia.

The preventive action in lithiasis of the gall bladder was studied in accordance with the test of François Besançon and Coll. described in Société Médicale des Hôpitaux de Paris 1,966, 117, no. 2, 127–138.

Four lots of five female mice 3 months old, of Swiss-Gif breed were tested by lithogenous regime for 6 weeks. The lithogenous regime is a normal nourishment for mice supplied by the U.A.R. Establishments, with the addition of 0.5 percent dosage of sodium dehydrochlorate (cf. François Besançon et al. 1965-1966).

The lot tested received no other treatment.

One of the medicaments of the invention was administered to each of 3 other lots subcutaneously in dosages of 36 mg., 6 days per week for 6 weeks.

At the end of the treatment, the mice were sacrificed and autopsies performed on them. The weight of the animals, the weight and color of their livers, the dimensions of the gall bladder, the presence of macroscopically visible stones and observations by polarizing microscope were noted. The findings are given in the following table.

TABLE I

| TREATMENT | WEIGHT OF MOUSE IN G. | WEIGHT OF LIVER IN G. | PERCENT WEIGHT OF LIVER | COLOR OF LIVER | VESICLE LITHIASIS | DIMENSIONS mm. | BIRFRINGENT CRYSTALS |
|---|---|---|---|---|---|---|---|
| None | 30 | 1.68 | 5.6 | colorless | + | 7×3 | numerous large masses |
| None | 28 | 1.67 | 6 | normal | 0 | 5.5×2.5 | normal |
| None | 28 | 1.38 | 4.9 | normal | + | 6×3 | many large masses |

Table I—Continued

| TREATMENT | WEIGHT OF MOUSE IN G. | WEIGHT OF LIVER IN G. | PERCENT WEIGHT OF LIVER | COLOR OF LIVER | VESICLE LITHIASIS | VESICLE DIMENSIONS mm. | BIREFRINGENT CRYSTALS |
|---|---|---|---|---|---|---|---|
| None | 35 | 2 | 5.7 | normal | + | 6.5×3 | normal |
| None | 25 | 1.04 | 4.2 | normal | + | 7.5×3 | many large masses normal |
| Compound I | 30 | 3.25 | 11 | normal | 0 | 6×2.5 | normal |
|  | 20 | 2.60 | 13 | normal | 0 | 4×1 | normal |
|  | 30 | 2.30 | 7.7 | normal | 0 | 6×3 | normal |
| Compound II | 22 | 3.85 | 18 | normal | 0 | 6×2 | small no. of large masses many small masses |
|  | 20 | 3.50 | 18 | normal | 0 | 11×2 | normal |
|  | 24 | 3.60 | 15 | normal | 0 | 5×1.5 | numerous very small masses |
| Compound III | 25 | 4.80 | 19 | normal | 0 | 6×2.5 | numerous very small masses |
|  | 21 | 3.92 | 19 | colorless | 0 | 7.5×4 | normal |
|  | 20 | 3.70 | 19 | normal | 0 | 7×2 | normal |

Compound I - ethyl p-trifluoromethylsulfonylphenoxyisobutyrate
Compound II - ethyl p-trifluoromethylthiophenoxyisobutyrate
Compound III - ethyl p-trifluoromethylphenoxyisobutyrate Table I demonstrates that in the five test mice subjected to the lithogenous regime with no other treatment, four showed macroscopically visible lithiasis and the polarizing microscope showed large cohesive doubly refractive crystals. In the fifth mouse, microscopic study showed normal bile and absence of lithiasis. The normal aspect of the bile is demonstrated by the existence of few doubly refractive crystals of small size and a maximum of 2 or 3 larger crystals in the gall bladder content.

On the other hand, in the animals treated by the lithogenous regime supplemented by the medications of this invention, no lithiasis was observed. Only 2 mice showed small crystals under microscopic examination, but in greater than normal numbers.

The other mice were normal under microscopic examination.

Thus the significant efficacy of the medicaments of this invention against gall bladder lithiasis is shown experimentally.

The hypocholesterol control activity of the compositions of this invention were studied according to the technique of THORP and WARING (Nature 1,962, 194, 948-49) as described hereafter.

The animals (male rats WISTAR) received orally a combination of androsterone and the medication under study incorporated in the diet in rates of 0.01 percent and 0.25 percent respectively for 11 days.

At the conclusion of the experiment, the rats were sacrificed in parts of the carotides and the cholesterol was given in doses to each animal by the method of Bloor.

The results for three of the compositions of this invention are given in the following table.

TABLE II

| TREATMENT | NO. OF ANIMALS | AVERAGE WEIGHT IN G. | | GAIN | DAILY INTAKE OF NOURISHMENT IN G. | CHOLESTEROLEMIA G/L |
|---|---|---|---|---|---|---|
| | | BEFORE TESTING | AFTER TESTING | | | |
| 0 | 5 | 162 | 226 | 39% | 87 | 0.92 |
| Androsterone | 5 | 187 | 249 | 33% | 97 | 0.90 |
| Androsterone + Compound I | 4 * | 186 | 270 | 45% | 89 | 0.76 |
| Androsterone + Compound II | 5 | 151 | 198 | 31% | 85 | 0.63 |
| Androsterone + Compound III | 5 | 168 | 208 | 23% | 83 | 0.61 |

*One animal losing weight because of a microbial infection was eliminated.

The comparison of the cholesterolemias of the animals treated with androsterone or in combination with compounds of the invention was made by comparative analysis. The results show a highly significant hydrocholesterolemia action by three of the compounds of this invention.

Tests were conducted to determine the lethal dosage in mice of compounds used in the methods of treatment of this invention. The compounds tested were:

A = ethyl p-trifluoromethylthiophenoxyisobutyrate
B = ethyl p-trifluoromethylphenoxyisobutyrate
C = ethyl p-trifluoromethylsulfonylphenoxyisobutyrate At 320 mg/kg of body weight dosage, the death rate was:

A = 0 percent
B = 0 percent
C = 0 percent

The lethal dose is therefore above 320 mg/kg.

The compounds of this invention therefore are entirely safe to use in daily dosage of 10 to 360 mg/kg of body weight.

The pharmacological testing shows that the methods of treatment of this invention are safe and effective in the treatment of cholesterolemia and suppress biliary lithiasis in mammals.

The pharmacological results were confined in human therapy, the compositions being administered in the form of capsules in dosages ranging from 1 to 2.5 grams per day.

What is claimed is:

1. The method of treating biliary lithiasis in mammals to suppess the biliary lithiasis in the mammal treated which comprises administering to a mammal, orally or parenterally, a daily dosage of 10 to 360 mg/kg of body weight of the mammal treated a fluorinated derivative of an ester of phenoxy isobutyric acid of the formula:

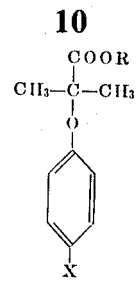

in which R is a straight or branched chain alkyl having 1 to 5 carbon atoms and X is trifluoromethyl, trifluoromethylthio, trifluoromethylsulfinyl or trifluoromethylsulfonyl.

2. The method of claim 1 in which the daily dosage is 140 to 280 mg/kg of body weight.

3. The method of claim 1 in which the fluorinated derivative is ethyl p-trifluoromethylphenoxyisobutyrate.

4. The method of claim 1 in which the fluorinated derivative is ethyl p-trifluoromethylthiophenoxyisobutyrate.

5. The method of claim 1 in which the fluorinated derivative is ethyl p-trifluoromethylsulfinylphenoxyixobutyrate.

6. The method of claim 1 in which the fluorinated derivative is ethyl p-trifluoromethylsulfonylphenoxyisobutyrate.

* * * * *